July 26, 1927.
C. M. EBERLING
1,637,142
GEARING
Filed March 2, 1926
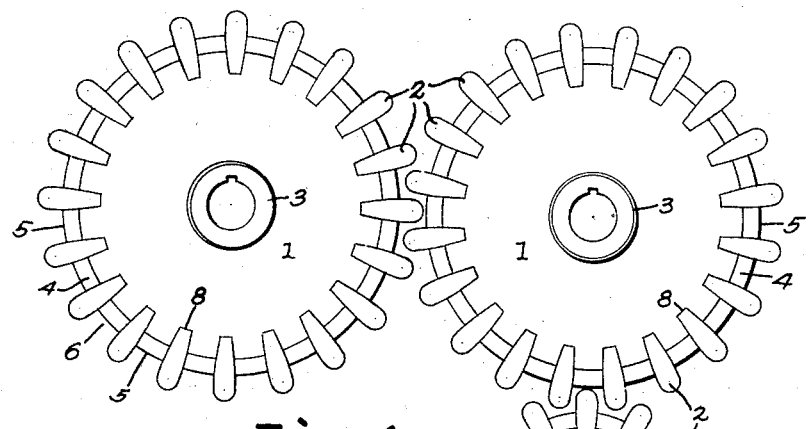
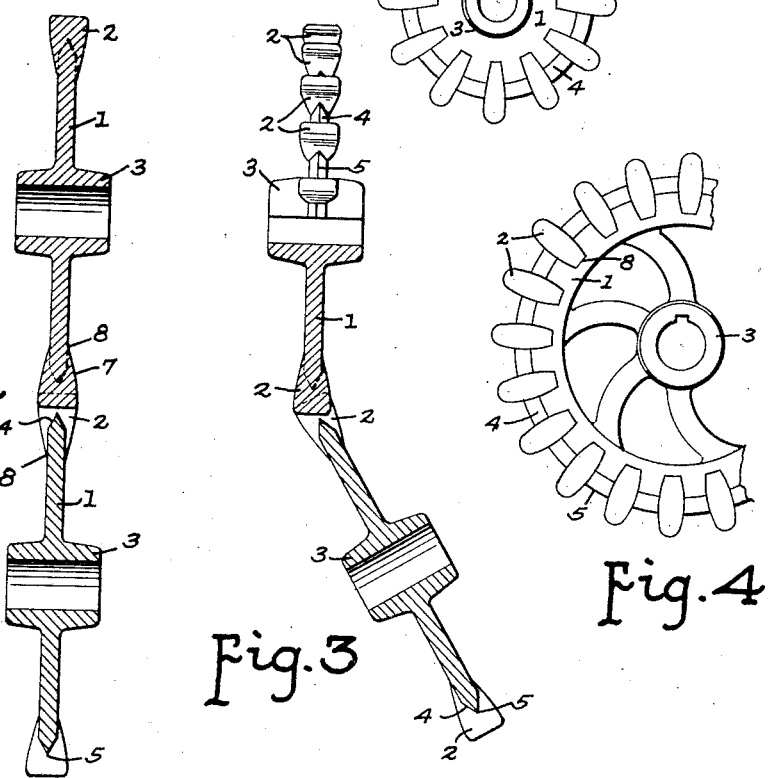
Charles M. Eberling
Inventor
by Smith & Freeman
Attorneys Patented July 26, 1927.

1,637,142

UNITED STATES PATENT OFFICE.

CHARLES M. EBERLING, OF CLEVELAND, OHIO, ASSIGNOR TO THE EBERLING MACHINES SALES COMPANY, OF CLEVELAND, OHIO, A CORPORATION OF OHIO.

GEARING.

Application filed March 2, 1926. Serial No. 91,724.

This invention relates to gearing and has for its object the provision of improvements enabling gears to be operated in the presence of grit, sand, dust, and granular materials without clogging or breakage and with less wear than heretofore, and also enabling a considerable variation in the angle between the planes of the gears. Examples of the utility of such devices occur in connection with concrete mixers, elevators for concrete, sand, gravel, crushed rock, coal, grain, flour and other granular materials; in connection with the operation of tractors and road or farm machinery; and in the driving of generators from the axles of railway cars. Many other uses of the invention will become apparent to those skilled in the art.

In the drawings accompanying this specification and forming a part of this application I have shown certain preferred physical embodiments of my inventive idea wherein Fig. 1 is a face view of a train of gears embodying my improvements, and Figs. 2 and 3 are central sectional views through meshing gears of my invention. Fig. 4 illustrates a segment of a modification.

Each gear comprises a body portion 1 and teeth 2 spaced about the same. The body portion is generally circular (always so excepting in the rare cases of elliptical or segmental gears) and the teeth project beyond the same both at the edge and at each side. The body may either consist of a web as shown in Fig. 1 or of a rim and spokes as shown in Fig. 4. In either case a suitable hub 3 is provided. The portion of the body between the teeth is beveled at each side as indicated at 4 providing a central circumferentially directed ridge 5 spaced inwardly a suitable distance from the pitch line 6. Viewed from the edge this body, or at least the portion thereof adjacent to the teeth appears narrower than the teeth, which are widest at their extremities and preferably taper inwardly as at 7 and merge therewith at a point 8 which is inside the limit of the beveled portion 4.

Each of the larger gears shown in Fig. 1 has twenty teeth, a pitch diameter of 11½ inches, an over-all diameter of 13 inches and a pitch of 1¾ inches, while the thickness (circumferential) of each tooth at the pitch circle is ¾ of an inch. The thickness of each tooth at its extremity is 1¼ inch while that of the web is 9/16 of an inch. I do not, however, limit myself to these dimensions but merely instance them as a successful example. Gears of different diameters can be run together as shown in Fig. 1, if only the pitch be the same.

Such gears are most conveniently made by casting to final form although the teeth can be shaped more accurately if desired. Owing to the thinness of the body adjacent to the teeth and still more to the beveling at 4 the teeth cleanse themselves without clogging and can be run successfully in a rain of sand, grain, or other granular or floury material or even when submerged therein. Of course the design of gear does not avoid a certain abrasion of the teeth by gritty substances but it prevents packing and clogging unless the particles are too large for the clearance. Also it will be noted that the teeth are made narrower than the spaces so as further to assist self clearing.

Another advantage produced by the beveling at 4 is that companion gears can be run with a considerable angle between their planes as shown in Fig. 3. I do not advocate this for heavy duty operation but instance the same as indicating the possibility of eliminating the need of any careful location of the gears. Thus in replacing a generator beneath a railway car it is sufficient if the driving and driven gears are brought only approximately into the same plane.

Having thus described my invention what I claim is:

A gear for the purpose described consisting of a one-piece metal casting comprising a relatively thin circular web having its peripheral edge symmetrically beveled from opposite sides thereof, radially extending teeth of greater width than said web arranged in spaced relation around the edge of said web with the connected ends of said teeth extending inwardly beyond the limit of said bevel of said edge and merging into said casting for strengthening said teeth.

In testimony whereof I hereunto affix my signature.

CHARLES M. EBERLING.